(12) United States Patent
Periathamby et al.

(10) Patent No.: US 7,781,531 B2
(45) Date of Patent: Aug. 24, 2010

(54) MODIFIED DENTAL PROSTHESIS

(75) Inventors: Antony R. Periathamby, Brookfield, WI (US); Andrew R. Dentino, Brookfield, WI (US)

(73) Assignee: Marquette University, Milwaukee, WI (US)

( * ) Notice: Subject to any disclaimer, the term of this patent is extended or adjusted under 35 U.S.C. 154(b) by 0 days.

(21) Appl. No.: 11/861,366

(22) Filed: Sep. 26, 2007

(65) Prior Publication Data

US 2008/0064823 A1 Mar. 13, 2008

Related U.S. Application Data

(63) Continuation of application No. 10/799,477, filed on Mar. 12, 2004, now Pat. No. 7,288,615.

(60) Provisional application No. 60/455,024, filed on Mar. 14, 2003.

(51) Int. Cl.
C08F 275/00 (2006.01)
A61C 13/00 (2006.01)

(52) U.S. Cl. ............... 525/287; 525/302; 525/303; 525/309; 433/199.1; 264/18

(58) Field of Classification Search ......... 525/287, 525/303, 309; 526/277, 319, 328.5; 264/18; 433/199.1

See application file for complete search history.

(56) References Cited

U.S. PATENT DOCUMENTS

| 3,723,240 | A | | 3/1973 | Skochdopole et al. |
| 3,987,127 | A | | 10/1976 | Dickie et al. |
| 4,044,044 | A | | 8/1977 | Saito |
| 5,055,497 | A | * | 10/1991 | Okada et al. ............ 523/116 |
| 5,502,087 | A | | 3/1996 | Tateosian et al. |
| 6,048,913 | A | | 4/2000 | Yamagishi et al. |
| 6,071,528 | A | | 6/2000 | Jensen |
| 6,395,800 | B1 | | 5/2002 | Jones et al. |
| 6,759,449 | B2 | * | 7/2004 | Kimura et al. ............ 523/118 |

FOREIGN PATENT DOCUMENTS

| EP | 74708 | * 3/1983 |
| JP | 05306208 | 11/1993 |

OTHER PUBLICATIONS

Wang et al. Journal of Dental Research (1991), 70(1), 59-66.
P. Antony Raj and G. Venkataraman, New and Novel Denture-base Polymers Resistant to Microbial Infection, J. Dent. Res. 80: 51, 2001.
P.A. Raj and A.R. Dentino, Phosphated Denture-base Polymer Resist Microbial Infection, American Association for Dental Research Meeting, San Antonio, TX, Mar. 2003 (available on-line in Nov. 2002).
S.E. Park, et al., Mechanical Properties of Surface-charged Resin Polymers as Denture Base, J. Dent. Res. 82: 37, Jun. 2003 (available on-line on Feb. 25, 2003).
Edgerton, M., Raj, P.A., and Levine, M.J., Surface-modified poly(methyl methacrylate) enhances adsorption and retains anticandidal activities of salivary histatin 5, J. Biomed. Mat. Res. 29: 1277-1286, 1995.

* cited by examiner

*Primary Examiner*—Helen L. Pezzuto
(74) *Attorney, Agent, or Firm*—Quarles & Brady, LLP

(57) ABSTRACT

Phosphate-containing co-polymers useful for making denture bases, denture liners and tissue conditioners with phosphate anion-charged surfaces are disclosed. The phosphate anions enable the denture bases, denture liners and tissue conditioners to adsorb cationic antimicrobial molecules. Dentures, denture bases materials, denture liners and tissue conditioners made of the above co-polymers are also disclosed. Further disclosed are methods for synthesizing the co-polymer(s) and for making the denture bases, denture liners and tissue conditioners.

10 Claims, 4 Drawing Sheets

MODIFIED DENTAL PROSTHESIS

CROSS-REFERENCE TO RELATED APPLICATIONS

This application is a continuation application of U.S. application Ser. No. 10/799,477 filed on Mar. 12, 2004, now U.S. Pat. No. 7,288,615 which claims the benefit of the U.S. provisional application Ser. No. 60/455,024, filed on Mar. 14, 2003.

STATEMENT REGARDING FEDERALLY SPONSORED RESEARCH OR DEVELOPMENT

Not applicable.

BACKGROUND OF THE INVENTION

Denture-induced stomatitis is a common clinical condition characterized by oral mucosal lesions, and is prevalent among denture users, particularly elderly or institutionalized patients. Adherence of *Candida albicans* to denture surfaces is the primary cause of denture-induced stomatitis. Other microbial species reported to contribute to the condition include *Streptococcus oralis, Streptococcus sanguis, Porphyromonas gingivalis* and *Prevotella intermedia*. Treatment of denture-induced stomatitis is problematic due to incomplete disinfection of the surface and rapid microbial recolonization of the dental prosthesis.

Typically, "pellicles," which contain high molecular weight salivary glycoproteins and immunoglobulins, including mucins, amylase and secretory IgA together with natural cationic antimicrobial peptides, form a thin film on surfaces of the oral cavity. On non-prosthetic surfaces, antimicrobial peptides such as histatins, defensins, and bactenecins, derived from saliva, mucosal epithelial cells and neutrophils, are a key protective component of the mucosal and enamel pellicles. Histatins and bactenecins, in particular, have been shown to exhibit antifungal and antibacterial activity against *Candida albicans* and other oral pathogens. These cationic peptides are adsorbed onto the tooth and oral mucosal surfaces by electrostatic forces.

In contrast, protective antimicrobial peptides are not present in the pellicle which forms on the denture surfaces. Dentures are conventionally made of polymethyl methacrylate (PMMA), which has polar ester groups but no ionically charged groups. The absence of ionic charge on PMMA facilitates the adhesion of *Candida albicans* and other microbial species onto denture surfaces by preventing the selective adsorption of antimicrobial peptides in saliva to prosthetic surfaces.

Introducing carboxylate groups into PMMA-based denture material to provide carboxylate ions on the surface has been shown to enhance adsorption of histatins and to decrease adherence of *Candida albicans* to denture surfaces (Edgerton, M., Raj, P. A., and Levine, M. J., *J. Biomed. Mat. Res.* 29:1277-1286, 1995; and Raj, P. A., and Venkataraman, G., *Dent. Res.* 80: 51, 2001). However, it is not known whether other groups such as phosphate groups can be successfully introduced into denture bases to provide negatively charged surfaces, and further, whether anionic phosphate surfaces have the ability to substantially enhance antimicrobial molecule adsorption as well as microbial adherence inhibition, especially under physiological conditions.

BRIEF SUMMARY OF THE INVENTION

In one aspect, the present invention relates to a phosphate-containing co-polymer useful for making a denture base, denture liner or tissue conditioner with a negatively charged surface for adsorbing cationic antimicrobial molecules such as salivary antimicrobial peptides. The co-polymer contains a repeating unit derived from an alkyl or aryl methacrylate monomer and a repeating unit derived from a phosphate-containing monomer having the formula

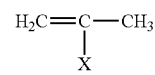

wherein X is either —O—PH$_2$O$_3$ or —R—O—PH$_2$O$_3$. The R group in —R—O—PH$_2$O$_3$ is either —COO—CH$_2$—CH$_2$ or a straight or branched alkyl chain of 10 carbon atoms or less. The two methylene groups in —COO—CH$_2$—CH$_2$ and the alkyl carbon chain can be substituted with an aryl group, a cycloalkyl group or both.

In another aspect, the present invention relates to a denture base, denture liner or tissue conditioning material made of the co-polymer described above. A denture having a denture base made of the co-polymer described above is also within the scope of the present invention.

In still another aspect, the present invention relates to a method for synthesizing the co-polymer described above or for making a denture base, denture liner or tissue conditioner containing the co-polymer.

In yet another aspect, the present invention relates to a kit that contains an antimicrobial solution for use with the denture of the present invention and an instruction sheet on how to treat the denture with the solution. Optionally, a denture of the present invention is also included in the kit.

It is an object of the present invention to provide a denture base, denture liner or tissue conditioner with a negatively charged surface for adhesion of cationic anti-microbial molecules.

It is a feature of the present invention that the charge on the surface of the denture base, denture liner or tissue conditioner is provided by a phosphate group.

It is an advantage of the present invention that the phosphate anions on the surface of the denture base, denture liner or tissue conditioner are the naturally occurring negatively charged molecules on the tooth enamel surface and normal oral tissues.

Other objects, advantages and features of the present invention will become apparent from the following specification.

PMMA2: MMA:MAP=90:10; PMMA3: MMA:MAP=85:15; PMMA4: MMA:MAP=80:20; PMMA5: MMA:MAP=75:25.

Figure 3:
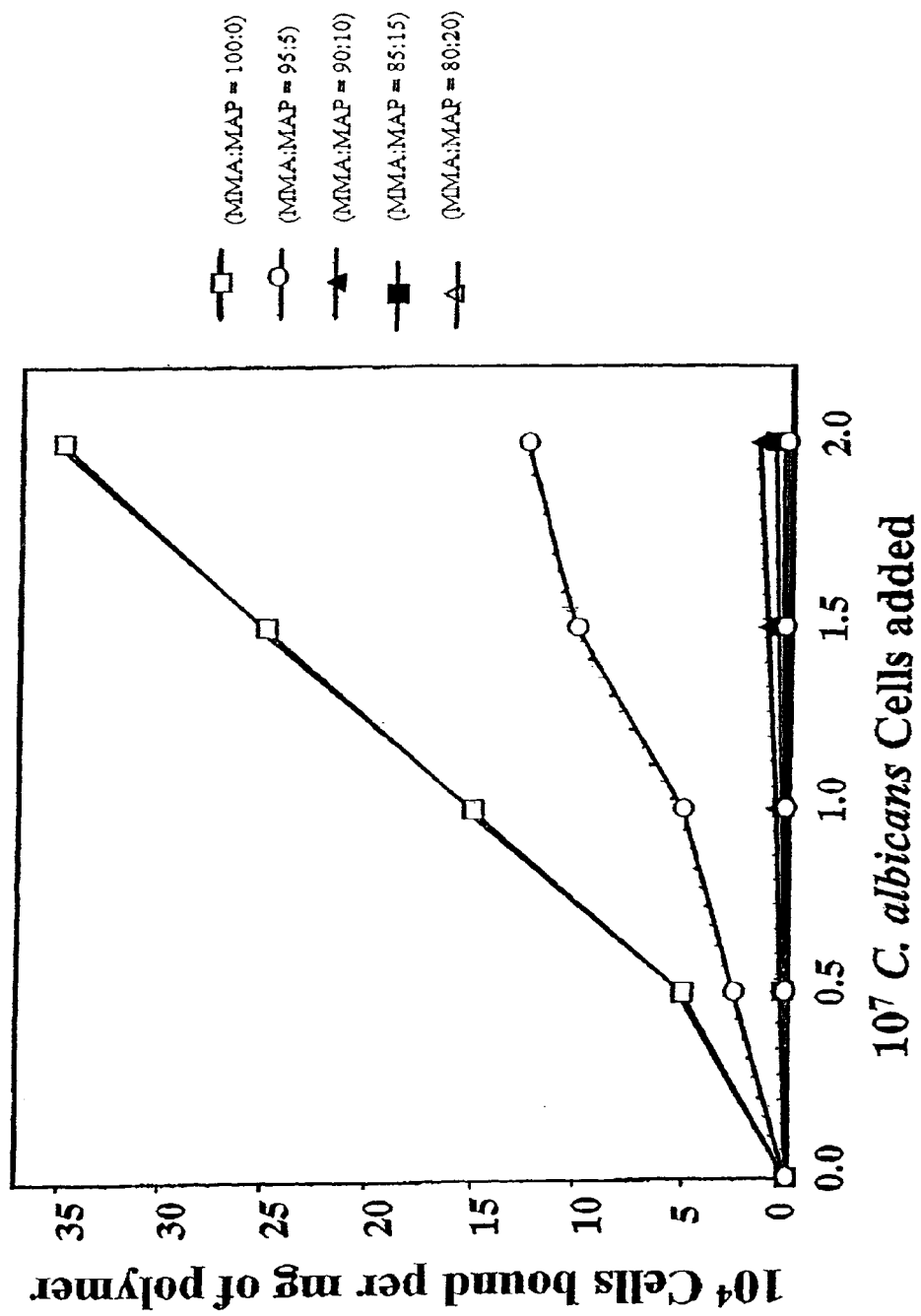

FIG. 3 is a graph showing adhesion of *Candida albicans* to histatin 5-adsorbed PMMA polymer surfaces. Adhesion is determined as a function of number of cells added versus number of cells bound per milligram of polymer.

Figure 4:
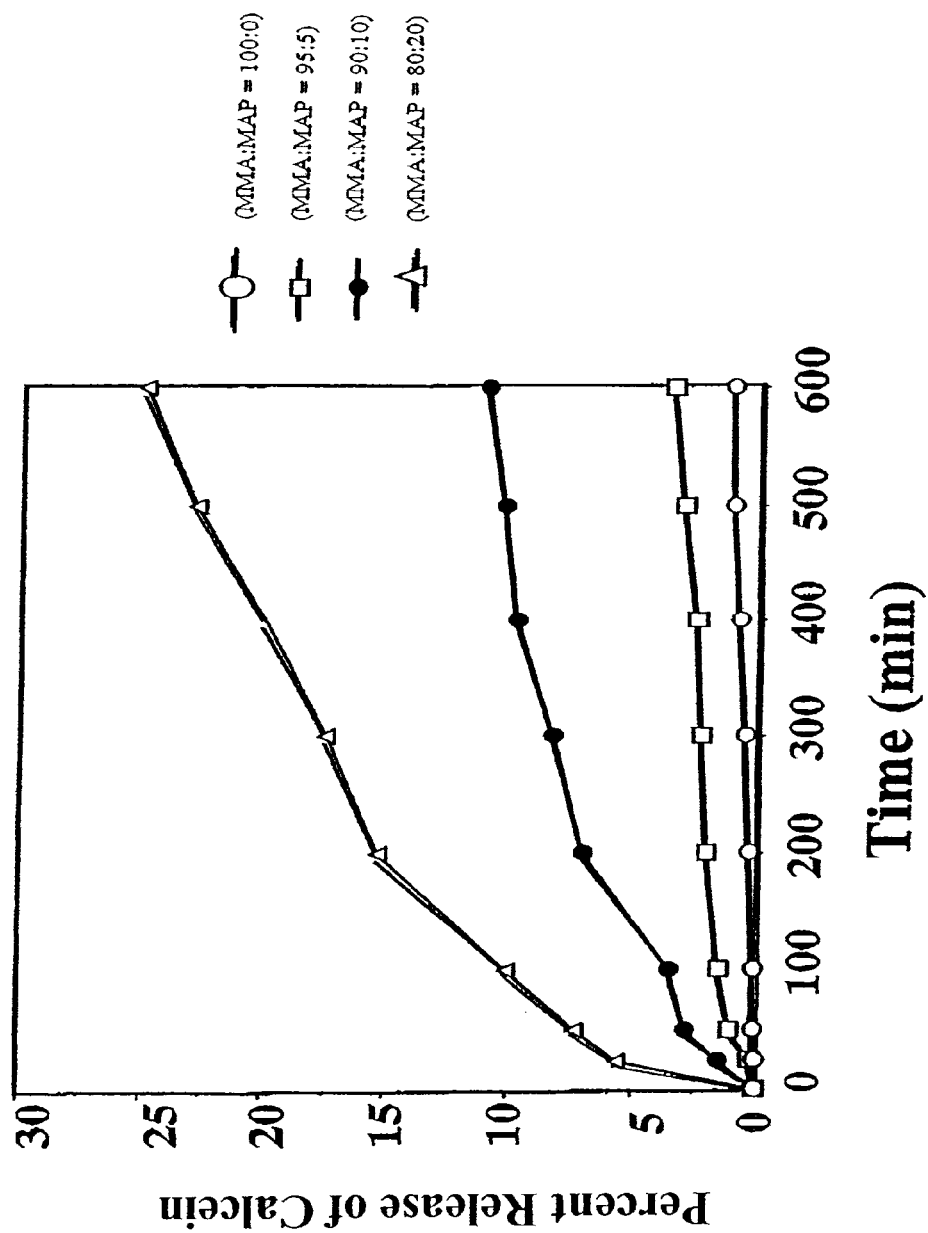

FIG. 4 is a graph showing Candidacidal activity of bactenecin 5-adsorbed polymers. Candidacidal activity is determined as a ftunction of percent calcein released from calcein-loaded cell per minute.

DETAILED DESCRIPTION OF THE INVENTION

It is disclosed here that a polyalkyl methacrylate- or polyaryl methacrylate-based denture base, denture liner or tissue conditioner can be improved by incorporating into the polymer a phosphate-containing monomer defined herein below. The phosphate group provides the denture base, denture liner or tissue conditioner with a negatively charged surface, which can readily adsorb salivary antimicrobial peptides and thus help to reduce the microbial infection rate in denture users. Polyalkyl methacrylate- and polyaryl methacrylate-based denture bases, denture liners and tissue conditioners are collectively referred to as PMMA-based denture bases, denture liners and tissue conditioners for the purposes of the present invention. Examples of PMMA-based denture bases, denture liners and tissue conditioners as well as polymers and methods for making them can be found in Phillip's Science of Dental Materials, Anusavice, K. D. ed., W.B. Saunders Company, Philadelphia, Pa., 1996, incorporated herein by reference as if set forth in its entirety. Additional PMMA-based denture bases and denture liners as well as polymers and methods for making them are also known in the art. Using PMMA-based denture base and phosphate-containing monomers methallayl phosphate (MAP) and ethylene glycol methacrylate phosphate (EGMP) as examples, the inventors demonstrated in the examples below that incorporating a phosphate-containing monomer of the present invention into the denture base polymer substantially improved the polymer's ability to adsorb antimicrobial peptides. As a result, microbial colonization on the polymer was inhibited. The examples below further demonstrated that incorporating a phosphate-containing monomer of the present invention into a PMMA polymer would not substantially affect the physical and mechanical properties of the polymer such as flexural strength.

The phosphate-containing monomer of the present invention is defined by the following formula:

(I)

wherein X is either —O—PH$_2$O$_3$ or —R—O—PH$_2$O$_3$. The R group in —R—O—PH$_2$O$_3$ is either —COO—CH$_2$—CH$_2$ or a straight or branched alkyl chain of 10 carbon atoms or less. The two methylene groups in —COO—CH$_2$—CH$_2$ and the alkyl carbon chain can be substituted with an aryl group, a cycloalkyl group or both.

In a preferred embodiment, the R group is CH$_2$ and the monomer is MAP. In another preferred embodiment, the R group is CH$_2$CH$_2$COO and the monomer is EGMP.

The monomers defined by formula (I) are either commercially available (e.g, EGMP can be obtained from Aldrich, Milwaukee, Wis.) or can be readily synthesized by a skilled artisan. For example, MAP can be synthesized from methyl methacrylate (MMA). MMA is first reduced to methallyl alcohol and methallyl alcohol is then phosphorylated to generate MAP. The reducing step can be performed with NaBH$_4$/EtOH or other reducing agents capable of reducing the ester moiety of MMA. The phosphorylation step can be performed with N,N-diethylphosphoramidite in the presence of 1-H-tetrazole followed by oxidation with m-chloroperbenzoic acid.

The co-polymer of the present invention contains a first repeating unit derived from an alkyl or aryl methacrylate monomer and a second repeating unit derived from the phosphate-containing monomer defined by formula (I). Preferably, the first repeating unit is derived from an alkyl or aryl methacrylate monomer that has 10 carbon atoms or less. More preferably, the first repeating unit is derived from MMA. A denture, denture base, denture liner or tissue conditioner made of the co-polymer is also within the scope of the present invention.

The co-polymer of the present invention can be synthesized by providing the two monomers and exposing the monomers to polymerization conditions under which the monomers polymerize to form the co-polymer. Such polymerization conditions are either familiar to or can be readily determined by a skilled artisan depending on the particular monomers used.

Alternatively, the co-polymer can be synthesized by providing a pre-polymerized polymer and the two monomers, and exposing the pre-polymerized polymer and the monomers to polymerization conditions under which they polymerize to form the co-polymer. Again, suitable polymerization conditions are either familiar to or can be readily determined by a skilled artisan depending on the particular pre-polymerized polymer and the monomers used. The pre-polymerized polymer can be a PMMA polymer, or a co-polymer containing a repeating unit derived from an alkyl or aryl methacrylate monomer and a repeating unit derived from a formula (I) monomer.

The above alternative method is the preferred method for making denture bases. Typically, in making denture bases, the pre-polymerized polymer is provided as polymer beads (powder) supplemented with a polymerization initiator and the monomers are provided as a liquid supplemented with a polymerization inhibitor for preventing undesirable polymerization. The polymer beads and the monomer liquid are mixed and heat-cured to produce a denture base. Preferably, the polymer beads and the monomer liquid are mixed at a ratio of about 3 to 1 (volume/volume) to minimize polymerization shrinkage. More details and examples of the bead suspension polymerization technique can be found in Phillip's Science of Dental Materials, Anusavice, K. D. ed., W.B. Saunders Company, Philadelphia, Pa., 1996.

In order to substantially maintain the physical and mechanical properties of a denture base, the amount of the phosphate-containing monomers incorporated into the PMMA polymer should be controlled. Preferably, the molar ratio of a repeating unit derived from the phosphate-containing monomer to a repeating unit derived from the alkyl or aryl methacrylate monomer in the final co-polymer should be equal to or less than 40:60, 35:65, 30:70, 25:75, 20:80, 15:85, 10:90, 5:95, 3:97 or 1:99. When EGOMP is used to form a co-polymer with MMA for making a denture base, the molar ratio of EGMP to MMA is preferably to be 10:90 or less, 5:95 or less, or 3:97 or less. If necessary, the physical and mechanical properties of a new phosphate-containing co-polymer can be readily tested by a skilled artisan and compared to those of a conventional denture base, such as a PMMA denture base, following the ADA/ISO Specifications ((ISO 1567:1999 (E)). Examples of physical and mechanical properties that can be tested and compared include water sorption, solubility, porosity, residue monomer, hardness, flexural strength, transverse strength, transverse deflection, and modulus elasticity. Denture liners are made more flexible than denture bases typically through the incorporation of large plasticizer molecules. Another type of dental prosthesis for lining dentures is tissue conditioners, which are softener and more flexible than denture liners. Tissue conditioners are used to line dentures to make them more comfortable and are particularly useful for relieving trauma caused by the denture rubbing on the inflamed tissues (e.g., in stomatitis). It is expected that a higher percentage of phosphate-containing monomers can be incorporated into denture liner and tissue conditioner co-polymers without substantially affecting a denture liner's physical and mechanical properties.

Most denture users have normal salivary functions and thus can readily benefit from the improved denture bases, denture liners and tissue conditioners disclosed herein. Some denture users, however, have impaired salivary functions characterized by the reduced level of salivary antimicrobial peptides. For these users, dentures, denture liners and tissue conditioners can be soaked in an antimicrobial solution before use. The antimicrobial solution is a solution that contains one or more antimicrobial agents that can be adsorbed onto a negatively charged surface. Examples of such antimicrobial agents include but are not limited to cationic antimicrobial proteins and active peptide fragments thereof. Preferred antimicrobial agents are salivary anti-microbial peptides such as histatins, defensins and bactenecins. The antimicrobial solution and one or more of a denture, denture liner and tissue conditioning materials can be conveniently provided as a kit to denture users and/or dental professionals. When the users run out of the antimicrobial solution, they can be resupplied with a kit containing an antimicrobial solution and instructions on how to treat a denture with the solution. Recently, the inventors have designed intra-oral drug delivery molecules that selectively adsorb onto charged surfaces and gradually release antimicrobial peptides over time (U.S. patent application Ser. No. 10/704,171, filed on Nov. 7, 2003, incorporated herein by reference as if set forth in its entirety). This intra-oral drug delivery system and a denture disclosed herein can also be provided as a kit to dental professionals.

It is appreciated that in addition to making denture bases, denture liners and tissue conditioners, the monomers and co-polymers disclosed herein can also be used to repair damaged denture bases, and to reline or rebase existing dentures.

The following examples are given to further illustrate the present invention. The present invention is not limited to the specific details set forth in the examples.

EXAMPLE 1

Preparation of Denture Base Polymers with Various Phosphate Content

Synthesis of polymers of MMA and MAP: Mixtures of MMA and MAP [MMA:MAP; 100:0; 95:5; 90:10; 85:15; 80:20; 75:25] in molar ratio were used as monomers. Bead (suspension) polymerization techniques were employed. In a 50 ml flask, 35 g of monomer mixture was stirred with 1.2 g of benzoyl peroxide (well ground). Then 0.75 ml of dimethyl paratoluidine was added and stirred briefly. The mixture was poured into 250 ml flask containing 1% poly (vinyl alcohol) and stirred well to prevent separation of two layers and the temperature was recorded. The reaction was allowed to proceed for 15 min after the rise in temperature ceased. The polymer beads were filtered, washed with distilled water and dried.

Characterization of polymer beads: The synthesized polymers were examined for the incorporation of phosphate by using FTIR and NMR studies. The polymers were checked for $^{31}P$ NMR resonance and examined by FTIR for changes in the region 1000-1200 cm$^{-1}$ (P=O and P—O IR bands). The polymers were dissolved in a mixture of chloroform and dimethyl sulfoxide for spectroscopic studies.

Synthesis of polymers of MMA and EGMP: Polymers with varying amounts of phosphate were synthesized using mixtures of MMA and EGMP as monomers described in the following molar ratios [MMA:EGMP; 100:0; 95:5; 90:10; 85:15; 80:20; 75:25]. Standard bead (suspension) polymerization technique described above in connection with the synthesis of polymers of MMA and MAP was employed, since the rate of polymerization can be well controlled through the cooling action of water. Polymer beads with an average molecular weight of the order of approximately 1 million kDa were obtained by this method.

EXAMPLE 2

Adsorption of Antimicrobial Peptides

Histatin 5 and bactenecin 5 adsorption experiments were conducted as described in Edgerton, M., Raj, P. A., and Levine, M. J. J. Biomed. Biomat. Res. 29: 1277-1286, 1995, and Raj, P. A., Johnsson, M., Levine, M. J., and Nancollas, G. H. J. Biol. Chem. 267: 5968-5976, 1992, both of which are herein incorporated by reference in their entirety. The polymer beads produced in accordance with Example 1 were equilibrated at room temperature for 2 hours with peptides (histatin 5 and bactenecin 5) of varying concentrations. The equilibration buffer employed was a saliva buffer that had the same ionic strength as that of human saliva and the same pH of 7.2 as that of the human oral cavity. The polymer beads were separated by centrifugation and the amount of peptides left in the supernatant was measured. The amount of the peptides adsorbed was then determined by subtracting the amount of peptides in the supernatant from the total amount peptides provided in the equilibration solution. When a relatively small amount of peptides was used in the experiments, $^{125}[I]$ peptides were used so that the amount of peptides could be measured by radioactivity. When a relatively large amount of peptides was used in the experiments, unlabeled peptides were used and the amount of peptides in the supernatant was determined by amino acid analysis.

Figure 1:
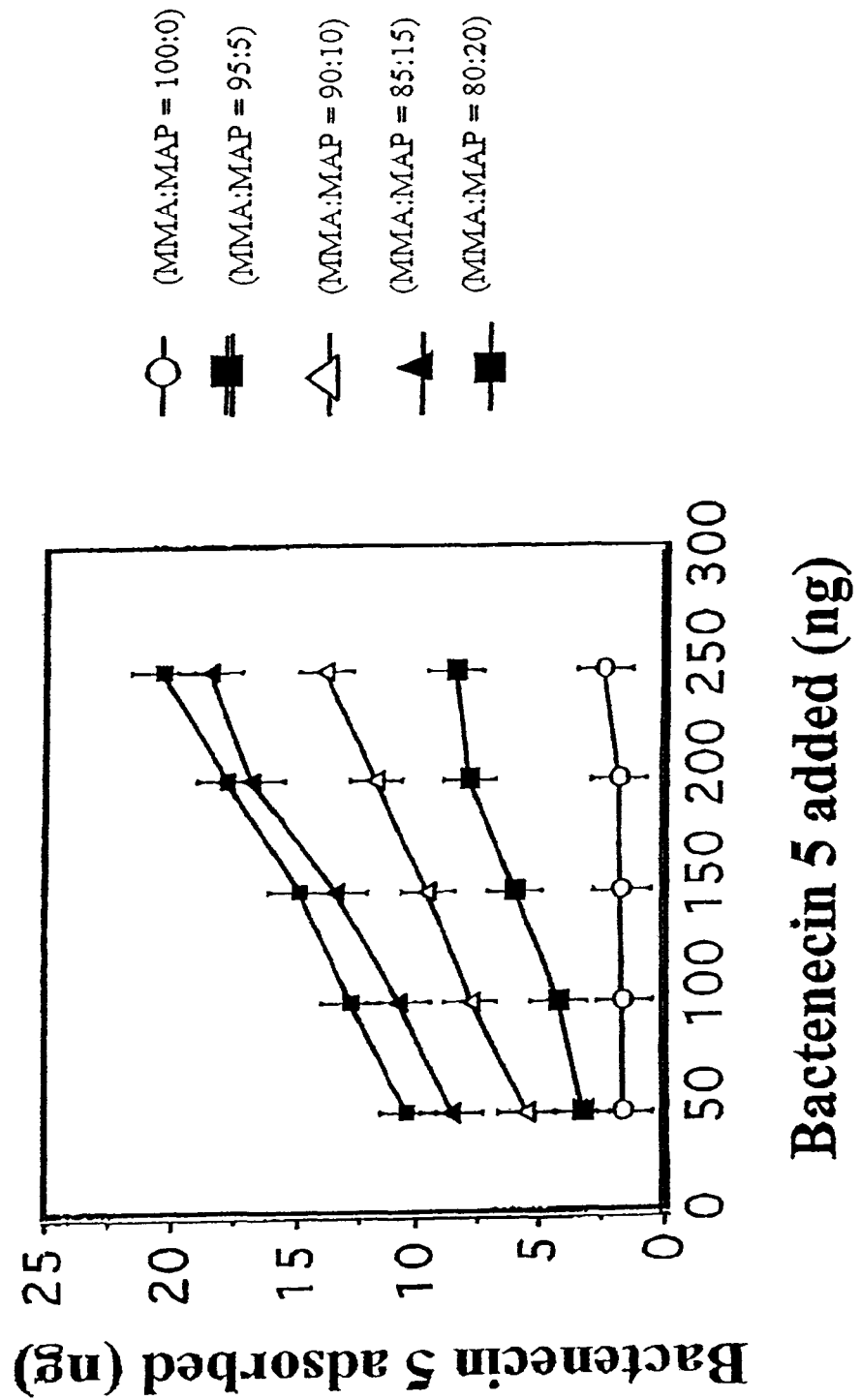
FIG. 1 is a graph showing the adsorption of bactenecin 5 on PMMA polymers. Adsorption is determined as a function of amount adsorbed versus nanograms added to PMMA beads.
Figure 2:
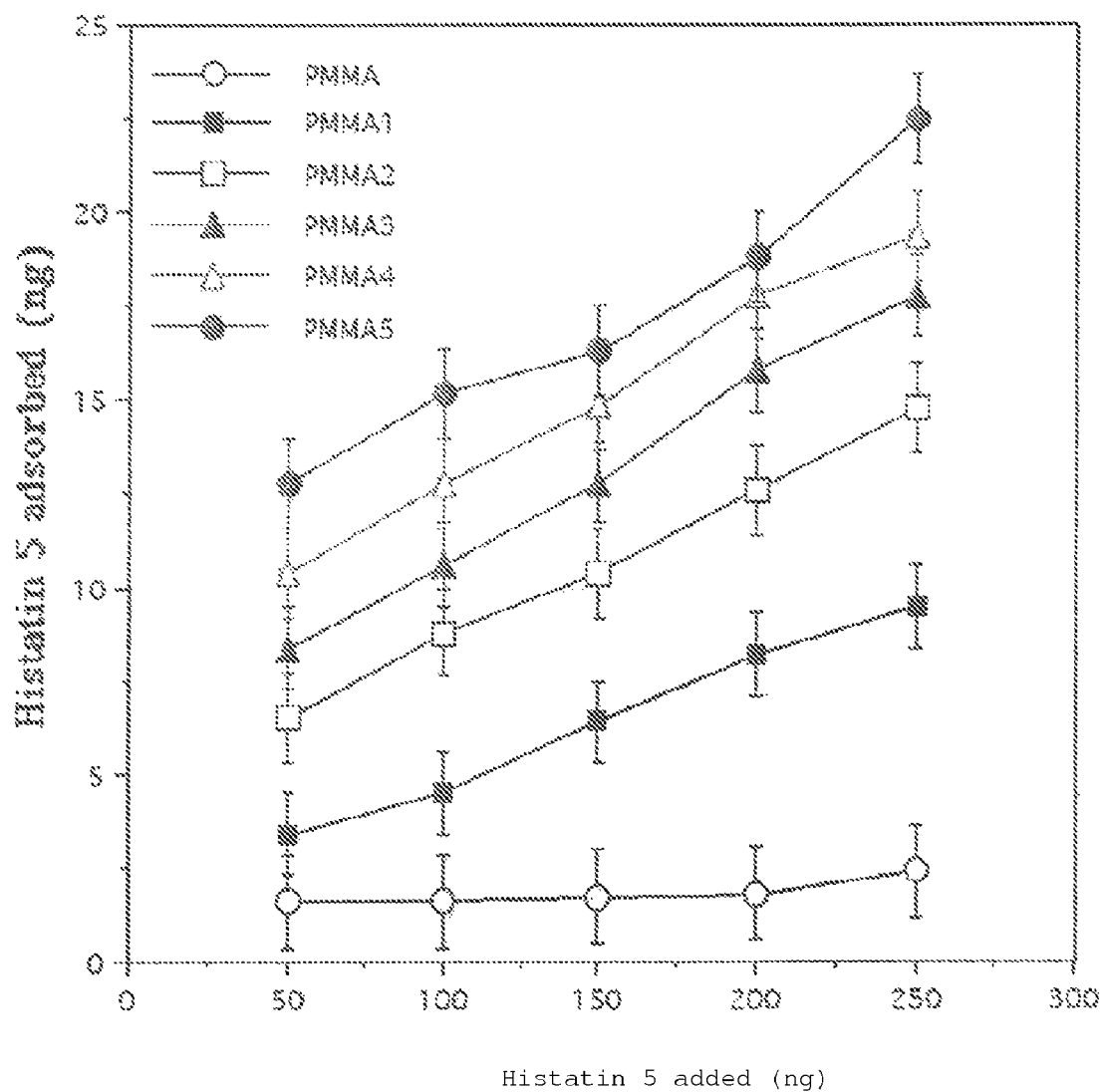
FIG. 2 is a graph showing the adsorption of histatin 5 on PMMA polymers. Adsorption is determined as a function of amount adsorbed versus nanograms added to PMMA beads. PMMA: MMA:MAP=100:0; PMMA1: MMA:MAP=95:5.

As shown in FIG. 1 and FIG. 2, increased adsorption of antimicrobial agents was correlated with increases in the negative charge on the polymer as the molar ratio of MAP in the PMMA co-polymer was increased. The result in FIG. 1 demonstrates increased adsorption of histatin 5. FIG. 2 shows that similar results were observed with bactenecin 5.

EXAMPLE 3

Adherence of *Candida Albicans*

Saliva-coated polymer beads were prepared as described in Edgerton, M., Raj, P. A., and Levine, M. J. J. Biomed. Biomat. Res. 29: 1277-1286, 1995. The saliva-coated polymers were allowed to adsorb histatin 5 as described in the Example 2. These histatin 5 adsorbed polymers were then incubated with $^{35}[S]$-labeled *Candida albicans* blastospore (strain DS1 isolated from the palate of a denture patient) at $10^8$ cells/ml in the saliva buffer described in Example 2. The incubation was conducted at 25° C. for 2 hours. Polymer beads were then recovered by centrifugation and the radioactivity of the polymer beads was determined. Adherence was calculated as the number of cells bound to the beads minus the background.

The results shown in FIG. 3 demonstrated that the adherence of *Candida albicans* to PMMA surfaces decreased with increases in negative charge.

EXAMPLE 4

Candidacidal Activity

Fluorescence spectroscopy was used to determine the Candidacidal activity of the peptide-adsorbed PMMA surface. *Candida albicans* (strain DS1) was incubated with calcein AM, a widely used green fluorescent cell marker. Calcein AM is membrane-permeant, and thus can be introduced into cells via incubation. Once inside cells, calcein AM is hydrolyzed by endogenous esterase into the highly negatively charged green fluorescent calcein, which is retained in the cytoplasm. Polymer beads produced by the method of Example 1 were coated with 250 μM bactenecin 5 and incubated with the calcein AM-labeled DS1. The release of calcein was monitored by fluorescence measurements of the suspension as an indicator of Candidacidal activity (Edgerton, M., Raj, P. A., and Levine, M. J. J. Biomed. Biomat. Res. 29: 1277-1286, 1995).

The results shown in FIG. 4 demonstrated that Candidacidal activity of the polymer increased with the increase in negative charge.

EXAMPLE 5

Flexural Strength of Denture Base Materials Made of MMA/EGMP Polymer

Flexural strength of denture base materials made of MMA/EGMP polymers were tested according to the ISO standards. The MMA/EGMP polymers were synthesized by using PMMA polymer beads and a mixture of MMA and EGMP monomers. The MMA and EGMP monomers were provided in the monomer mixture in a ratio such that the weight ratio of MMA-derived repeating unit to EGMP-derived repeating unit in the final MMA/EGMP polymer was about 80:20 (referred to as E20 polymer) or about 90:10 (referred to as E10 polymer). Specimen plates were prepared and machined to the dimensional specifications (50 mm length×10 mm width× 3.3 mm height) within 0.02 mm. Before testing the specimens were stored in water at 37° C. for 50 hours and were tested under water by loading with a cross head speed 5±1 mm/min.

Table 1 shows the averages and standard deviations of flexural strength (MPa units) for denture base materials made of E20 and E10 polymers in comparison to a commercially available standard (Lucitone-99). Incorporating up to 10% (weight) and 20% (weight) EGMP into PMMA reduced the flexural strength by only 7% and 13%, respectively.

TABLE 1

| Specimen | E20-MPa | E10-MPa | C-MPa |
|---|---|---|---|
| 1 | 64.07 | 64.20 | 77.95 |
| 2 | 65.60 | 66.52 | 75.73 |
| 3 | 59.18 | 65.81 | 65.22 |
| 4 | 64.52 | 71.69 | 74.84 |

TABLE 1-continued

| Specimen | E20-MPa | E10-MPa | C-MPa |
|---|---|---|---|
| 5 | 64.71 | 69.49 | 74.46 |
| 6 | 56.57 | 63.89 | 64.77 |
| Mean | 62.44 | 66.94 | 72.16 |
| SD | 3.67 | 3.08 | 5.68 |
| CV | 5.87 | 4.60 | 7.88 |

SD = Standard Deviation
CV = Coefficient of Variation
t-Test Results:

| Groups | p Value |
|---|---|
| E20:E10 | 0.0094 |
| E20:C | 0.0001 |
| E10:C | 0.0319 |

The present invention is not intended to be limited to the foregoing examples, but to encompass all such modifications and variations as come within the scope of the appended claims.

We claim:

1. A method for making a denture base, the method comprising the steps of:
   providing a pre-polymerized polymer resin suitable for making the denture base,
   providing a liquid comprising an alkyl or aryl methacrylate monomer and a phosphate-containing monomer having the formula

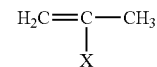

wherein X is selected from the group consisting of —O—PH$_2$O$_3$ and —R—O—PH$_2$O$_3$, wherein the R group in —R—O—PH$_2$O$_3$ is selected from the group consisting of —COO—CH$_2$—CH$_2$ and a straight or branched alkyl chain of 10 carbon atoms or less,
wherein the two methylene groups in —COO—CH$_2$—CH$_2$ and the alkyl carbon chain can be substituted with an aryl group, a cycloalkyl group or both; and
mixing the pre-polymerized polymer resin with the liquid under conditions that allow the pre-polymerized polymer and the monomers to polymerize to form a denture base comprising a co-polymer that comprises a first repeating unit derived from the alkyl or aryl methacrylate monomer and a second repeating unit derived from the phosphate-containing monomer wherein the molar ratio of said first repeating unit to said second repeating unit in the co-polymer is 60 to 40 or higher;
wherein the denture base made of the co-polymer has a flexural strength of at least 62.44 megapascals (MPa).

2. The method of claim 1, wherein the first repeating unit is derived from an alkyl or aryl methacrylate monomer that has 10 carbons or less.

3. The method of claim 1, wherein the first repeating unit is derived from methyl methacrylate.

4. The method of claim 1, wherein the second repeating unit is derived from methallyl phosphate.

5. The method of claim 1, wherein the second repeating unit is derived from ethylene glycol methacrylate phosphate.

6. The method of claim 1, wherein the molar ratio of the first repeating unit to the second repeating unit is at least 70 to 30.

7. The method of claim 1, wherein the molar ratio of the first repeating unit to the second repeating unit is at least 75 to 25.

8. The method of claim 1, wherein the molar ratio of the first repeating unit to the second repeating unit is at least 80 to 20.

9. The method of claim 1, wherein the pre-polymerized polymer is a polymethyl methacrylate (PMMA) polymer.

10. The method of claim 1, wherein the pre-polymerized polymer is a co-polymer containing a first repeating unit derived from the alkyl or aryl methacrylate monomer and a second repeating unit derived from the phosphate-containing monomer.

* * * * *